(12) United States Patent
Hoffjann et al.

(10) Patent No.: US 7,807,315 B2
(45) Date of Patent: Oct. 5, 2010

(54) ROTABLE FUEL CELL SYSTEM

(75) Inventors: Claus Hoffjann, Hamburg (DE);
Hansgeorg Schuldzig, Jork (DE);
Hans-Juergen Heinrich, Hamburg (DE)

(73) Assignee: Airbus Deutschland GmbH (DE)

( * ) Notice: Subject to any disclaimer, the term of this patent is extended or adjusted under 35 U.S.C. 154(b) by 988 days.

(21) Appl. No.: 11/225,589

(22) Filed: Sep. 13, 2005

(65) Prior Publication Data
US 2006/0099477 A1 May 11, 2006

Related U.S. Application Data

(60) Provisional application No. 60/609,969, filed on Sep. 15, 2004.

(30) Foreign Application Priority Data
Sep. 15, 2004 (DE) .................. 10 2004 044 654

(51) Int. Cl.
*H01M 8/02* (2006.01)
*H01M 8/04* (2006.01)
(52) U.S. Cl. ........................ 429/507; 429/492
(58) Field of Classification Search .............. 429/32
See application file for complete search history.

(56) References Cited

U.S. PATENT DOCUMENTS

| | | | | |
|---|---|---|---|---|
| 3,972,731 A | * | 8/1976 | Bloomfield et al. | ......... 429/17 |
| 4,046,001 A | * | 9/1977 | Maeda et al. | ............ 73/774 |
| 6,051,330 A | * | 4/2000 | Fasano et al. | ............. 429/30 |
| 6,189,339 B1 | * | 2/2001 | Hiraiwa | ................. 65/17.3 |
| 6,378,637 B1 | * | 4/2002 | Ono et al. | ............... 180/65.3 |
| 6,379,828 B1 | * | 4/2002 | Worth | ..................... 429/14 |
| 6,720,102 B2 | * | 4/2004 | Edwards | ................. 429/32 |
| 2001/0016276 A1 | * | 8/2001 | Yamanashi | ............. 429/22 |
| 2003/0054215 A1 | * | 3/2003 | Doshi et al. | ........... 429/26 |
| 2003/0096148 A1 | * | 5/2003 | Edwards | ............... 429/32 |
| 2003/0165720 A1 | * | 9/2003 | DeFilippis | ............. 429/13 |

FOREIGN PATENT DOCUMENTS

| | | |
|---|---|---|
| DE | 3530010 A1 | 3/1987 |
| DE | 100 35 232 A1 | 2/2002 |
| EP | 0 911 896 A1 | 4/1999 |
| GB | 2128946 | 5/1984 |
| JP | 2001-102081 | 4/2001 |
| JP | 2003-208917 | 7/2003 |

* cited by examiner

*Primary Examiner*—Dah-Wei D Yuan
*Assistant Examiner*—Stephan Essex
(74) *Attorney, Agent, or Firm*—Lerner, David, Littenberg, Krumholz & Mentlik, LLP

(57) ABSTRACT

For operation, PEMFCs require among other things a compressor for the cathode air, and a system for removing the water which is generated on the cathode side as a result of the electrochemical reaction. According to an embodiment of the present invention the removal of water is supported in that the fuel cell is made to rotate by way of an electric motor so that the water contained in the cathodes of the fuel cell can be extracted by centrifugal force. To this effect the air channels on the cathode side are arranged so as to extend radially or in a spiral shape from the inside towards the outside. In this way the efficiency of the fuel cell can be significantly improved.

16 Claims, 3 Drawing Sheets

ROTABLE FUEL CELL SYSTEM

CROSS-REFERENCE TO RELATED APPLICATIONS

This application claims the benefit of the filing date of U.S. Provisional Patent Application No. 60/609,969 filed Sep. 15, 2004, the disclosure of which is hereby incorporated herein by reference.

BACKGROUND OF THE INVENTION

Fuel cells, in particular so-called proton exchange membrane fuel cells (PEMFCs) require for operation, among other things, a compressor for the cathode air, and a system for letting off the water generated on the cathode side by electrochemical reaction. In order to prevent oversaturation by the generated water on the cathode side, which oversaturation would be disadvantageous for implementation, and in this way achieve an effective water production rate, the water must be continuously removed in the form of water vapour and water droplets. Often the air stream generated by the compressor is insufficient for optimal removal of the water generated on the cathode side.

There may be a need to provide an improved fuel cell system for generating electrical energy, mechanical energy or water.

SUMMARY OF THE INVENTION

The present invention relates to fuel cell systems. In particular, the present invention relates to a fuel cell system for generating electrical energy, mechanical energy and water; to the use of such a fuel cell system in an aircraft; and to an aircraft comprising such a fuel cell system.

According to an exemplary embodiment of the present invention, as stated in claim 1, the above object may be met by means of a fuel cell system for generating electrical energy, mechanical energy and water. The fuel cell system comprising a fuel cell held so as to be rotatable, a motor and a first non-positive connection between the fuel cell and the motor, wherein by way of the first non-positive connection energy is transferable from the motor to the fuel cell so that the fuel cell can be made to rotate.

As a result of the design of the fuel cell system the fuel cell may be made to rotate in such a way that an additional conveying force is provided, which may promote removal of the water generated by the electrochemical reaction within the fuel cell. This force may be derived from a centrifugal force in that the fuel cell held so as to be rotatable is made to rotate. In this way the removal of water may be significantly accelerated, which can lead to a more effective cathode reaction and thus to an increase in the efficiency of the fuel cell.

According to a further exemplary embodiment of the present invention, as stated in claim 2, the fuel cell system further comprises a compressor, wherein the compressor is designed to provide cathode air to the fuel cell, and wherein as a result of the rotation of the fuel cell the water generated in an electrochemical reaction in the fuel cell on a cathode side of the fuel cell is extractable by centrifugal force.

Thus, a fuel cell system may be provided in which removal of the water generated on the cathode side takes place not only by means of the centrifugal force which may result from the rotation of the fuel cell system or of the fuel cell, but also by means of compressed air which may be generated by the compressor and which is fed into the cathode of the fuel cell. The addition of centrifugal force and conveying force (resulting from the air stream generated by the compressor) may accelerate water removal from the cathode space and thus causes an effective cathode reaction.

According to a further exemplary embodiment of the present invention, as stated in claim 3, the first non-positive connection between the fuel cell and the motor comprises a first clutch and a torque converter, wherein the first clutch is a mechanical or electromechanical clutch.

Thus, the power may be transmitted in a metered way from the motor to the fuel cell. For example, if necessary, decoupling the fuel cell from the motor may also be possible so that for example the motor can drive other components without driving the fuel cell.

According to a further exemplary embodiment of the present invention, as stated in claim 4, the fuel cell system further comprises a load controller, wherein the load controller is designed to distribute the required electrical energy between the motor and further electrical consumers, or is designed to control or regulate the torque converter and the clutch. The electrical energy required for this may be internally supplied by the fuel cell or by an external energy source.

It may be thus possible to ensure electronic energy management which may provide energy to the motor or to other electrical consumers as required. Furthermore, the load controller may control or regulate the torque converter and the clutch of the non-positive connection between the fuel cell and the motor so that in this way electronic speed control of the fuel cell may be ensured.

According to a further exemplary embodiment of the present invention, as stated in claim 5, the rotary speed of the fuel cell and thus a water discharge from cathode-side air channels of the fuel cell can be regulated or controlled, either continuously or intermittently, by way of the load controller and the torque converter, depending on the electrical or mechanical load.

Thus, it may for example be possible, in the case of an increased mechanical load on the motor, to regulate the rotary speed of the fuel cell down so that the energy requirement of the motor may drop accordingly.

According to a further exemplary embodiment of the present invention, as stated in claim 6, a rotary speed of the compressor can be regulated or controlled, either permanently or intermittently, by way of the load controller and the torque converter, depending on the electrical or mechanical load, wherein a rotary speed of the fuel cell can be regulated or controlled, either permanently or intermittently, by way of the load controller and the torque converter, independently of the electrical or mechanical load.

In this way the rotary speed of the compressor and the fuel cell may be set independently of each other, wherein the rotary speed of the compressor may be guided by the electrical or mechanical load, and wherein the rotary speed of the fuel cell may be set or regulated independently thereof.

According to a further exemplary embodiment of the present invention, as stated in claim 7, the fuel cell system further comprises a water pump and a second non-positive connection between the motor and the water pump, wherein, by way of the second non-positive connection, energy from the motor can be transmitted to the water pump so that the water pump can be made to rotate, and wherein the water pump returns a condensate from the cathode exhaust air of the fuel cell for further utilisation by the fuel cell, or removes said condensate from the fuel cell system.

Thus, a fuel cell system may be stated which can independently return the cathode air removed by centrifugal force, or, if applicable, may return said cathode air to the fuel cell for further utilisation within the fuel cell.

According to a further exemplary embodiment of the present invention, as stated in claim 8, the fuel cell system further comprises a shaft which is non-positively connected to an armature of the motor or to a displacement device of the compressor.

According to a further exemplary embodiment of the present invention, as stated in claim 9, the fuel cell is constructed from rotation-symmetrical components as a hollow cylinder.

This may ensure smoothness of running and low mechanical load for example of the shaft during rotation of the fuel cell on its longitudinal axis.

According to a further exemplary embodiment of the present invention, as stated in claim 10, in the region of the fuel cell the shaft is a first hollow shaft, wherein the first hollow shaft is designed to feed hydrogen to an anode of the fuel cell.

Thus, even with rotation of the fuel cell on the rotary axis, hydrogen may be fed to the fuel cell anode in an easy manner.

According to a further exemplary embodiment of the present invention, as stated in claim 11, a second hollow shaft is provided which encloses the first hollow shaft, wherein the second hollow shaft is designed for feeding air to the fuel cell.

It may thus be possible to feed different gases independently of each other to the fuel cell.

According to a further exemplary embodiment of the present invention, as stated in claim 12, the fuel cell comprises air channels on the cathode side, and gas channels on the anode side, wherein the air channels are arranged so as to extend radially or in a spiral shape from the inside towards the outside, and wherein the arrangement of the gas channels corresponds to the arrangement of the air channels.

Thus, the removal of water from the cathode space may thus be further enhanced.

According to a further exemplary embodiment of the present invention, as stated in claim 13, the fuel cell comprises a collection space for water, and a housing which encloses the collection space, wherein the housing accommodates bearing elements for the shafts and also accommodates rotary transmission leadthroughs.

It may thus be possible to collect within the fuel cell the water removed from the cathode.

Further objects, embodiments and advantages of the invention are disclosed in the dependent claims and in the further independent claims.

Below, the invention is described in more detail by means of exemplary embodiments with reference to the drawings.

DETAILED DESCRIPTION

In the following description of the figures the same reference signs are used for identical or similar elements.

Figure 1:
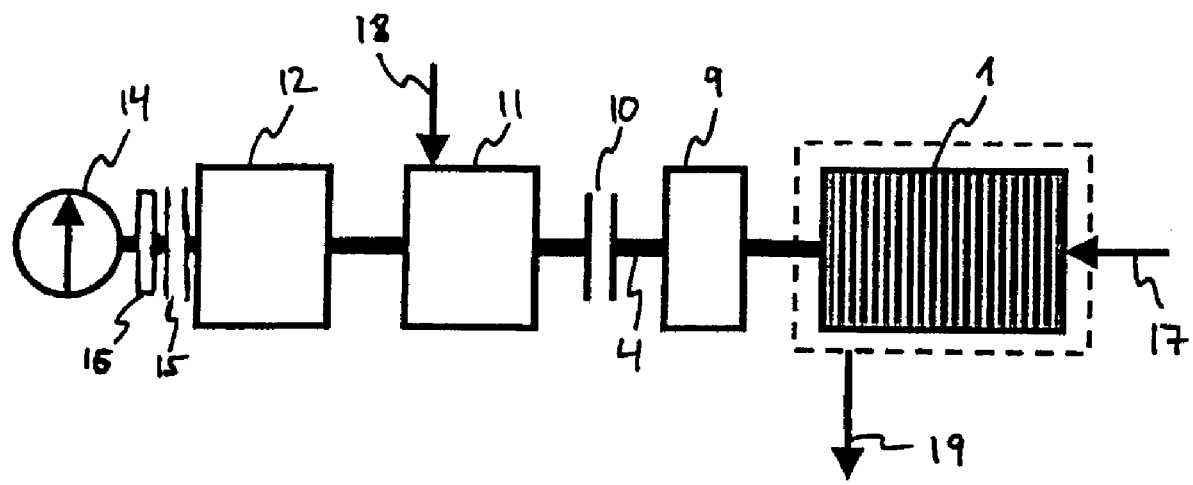
FIG. 1 shows a diagrammatic view of a fuel cell system according to an embodiment of the present invention.

FIG. 1 shows a first diagrammatic view of a fuel cell system according to an embodiment of the present invention. As shown in FIG. 1, the fuel cell system comprises a proton exchange membrane fuel cell (PEMFC) 1, an electric motor 12, a compressor 11, a clutch 10, a torque converter 9 and a pump 14.

By way of a corresponding line, hydrogen 17 is fed to the fuel cell 1, and by way of a corresponding other line, humid air 19 is removed from the fuel cell 1. In this arrangement, the feeding in of hydrogen 17 is by way of a hollow shaft (not shown in FIG. 1) which forms part of a main shaft 4. The hydrogen is then fed to an anode (not shown in FIG. 1) of the fuel cell 1 so that an electrochemical reaction within the fuel cell can take place, by way of which reaction electrical energy and water are generated.

The water that arises in the cathode of the fuel cell 1, is removed from the cathode and is removed as humid air 19 or as water.

In this arrangement the fuel cell 1 is held, so as to be rotatable, on the shaft 4 and by way of the clutch 10 and the torque converter 9 is non-positively connected to the electric motor 12. Furthermore, the fuel cell 1 can be made to rotate by means of the electric motor 12. According to the invention, this rotary movement leads to improved removal of the water from the cathode system of the fuel cell 1, which improved removal is due to the centrifugal force generated, and thus leads to improved efficiency of the fuel cell.

As shown in FIG. 1, the fuel cell system further comprises a pump 14 which, by way of a second non-positive connection that is consists of and/or comprises a second clutch 15 and a second torque converter 16, is connected to the shaft 4, and is thus drivable by way of the electric motor 12. The water pump 14 can for example be used to return a condensate from the cathode exhaust air 19 to the fuel cell 1 so that it can continue to be used within the fuel cell. Of course, the pump 14 can also be used to entirely remove the condensate from the humid air 19 from the fuel cell system. Subsequently, the condensate can for example be fed to the water supply system of an aircraft in which the fuel cell system is installed.

The electric motor 12 comprises an armature (not shown in FIG. 1), while the compressor 11 comprises a displacement device (not shown in FIG. 1). Both the displacement device and the armature are non-positively connected to the shaft 4.

In order to minimise the mechanical load on the rotating parts, the fuel cell 1 is constructed from rotationally symmetrical components as a hollow cylinder.

Furthermore, the fuel cell 1 comprises air channels on the cathode side, and gas channels on the anode side, which channels are arranged radially or in a spiral shape from the inside towards the outside. In this way the efficiency of the fuel cell can be further enhanced.

Figure 2:
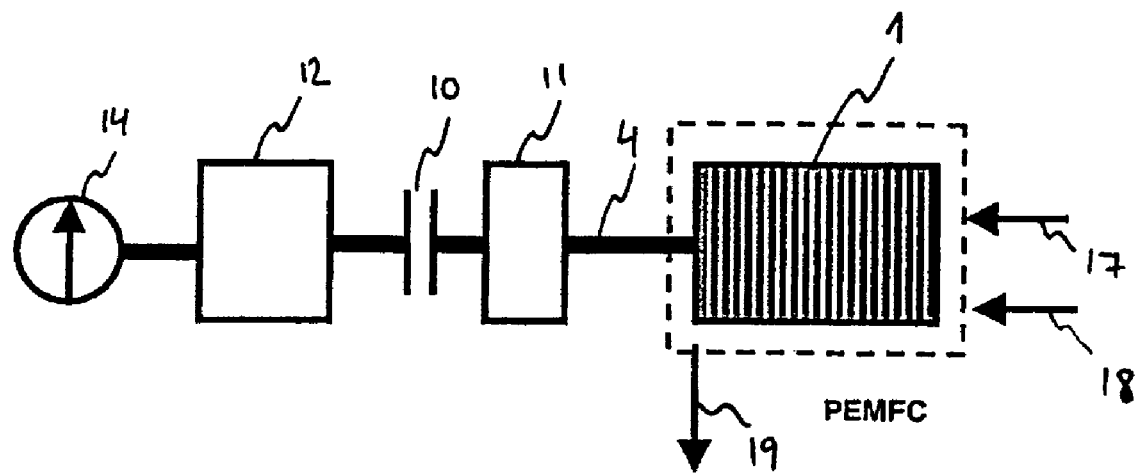
FIG. 2 shows a diagrammatic view of a further fuel cell system according to another embodiment of the present invention.

FIG. 2 shows a second diagrammatic view of a fuel cell system according to another embodiment of the present invention. In this arrangement the fuel cell 1 is designed such that hydrogen gas 17 can be fed to it by way of a first hollow shaft (see FIG. 4), and such that air 18 can be fed to it by way of a second hollow shaft (see FIG. 4).

No compressor is provided in the fuel cell system shown in FIG. 2.

A mechanical or electromechanical clutch 10 and a torque converter or gear arrangement 9 is arranged between the electric motor 12 and the fuel cell 1.

Figure 3:
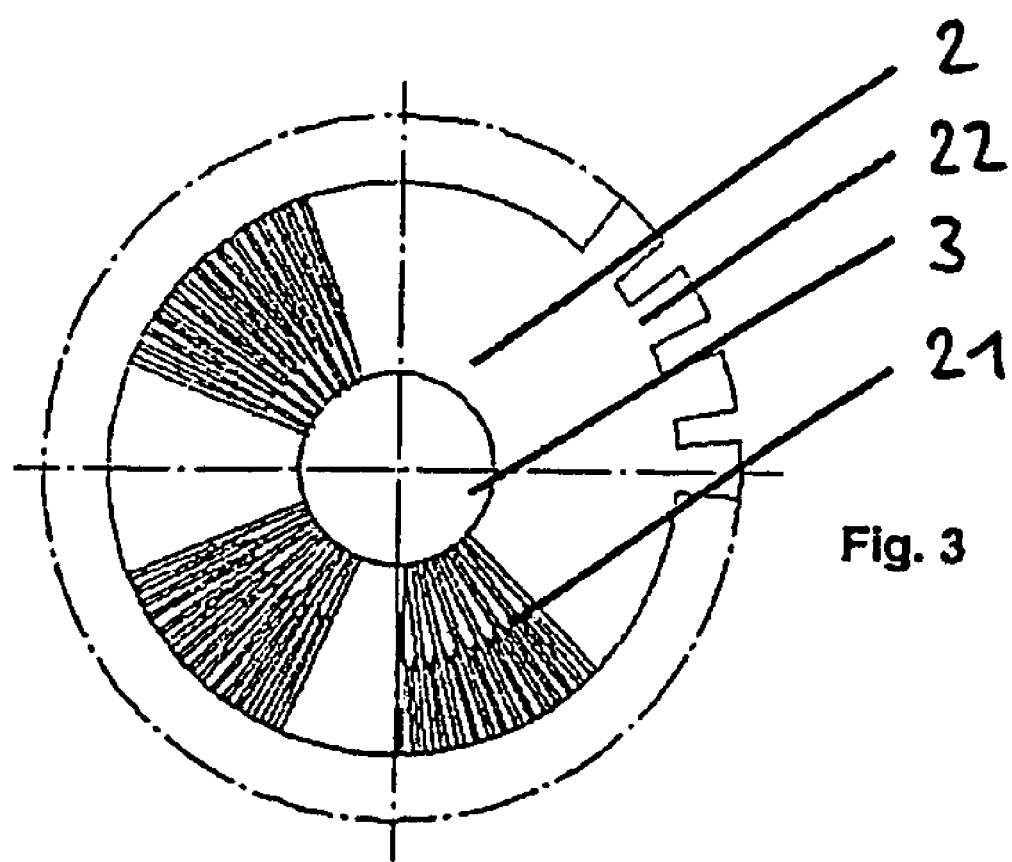
FIG. 3 shows a diagrammatic cross-sectional view of a bipolar plate according to an embodiment of the present invention.

FIG. 3 shows a diagrammatic cross-sectional view of a bipolar plate according to an embodiment of the present invention. As shown in FIG. 3, the bipolar plate 2 comprises cathode air channels 21. Furthermore, in radial direction the bipolar plate 2 is designed in the manner of cooling lamellae or blades. The cooling lamellae or blades 22 can be used for cooling the fuel cell. The fuel cell, together with the bipolar plates 2, is held in its housing so as to be rotatable (see FIG. 4). In this arrangement the housing comprises an inflow channel and an outflow channel for cooling air. The bipolar plates are held, so as to be rotatable, in the region of the central borehole 3.

According to one embodiment of the present invention the housing is an axial blower.

Figure 4:
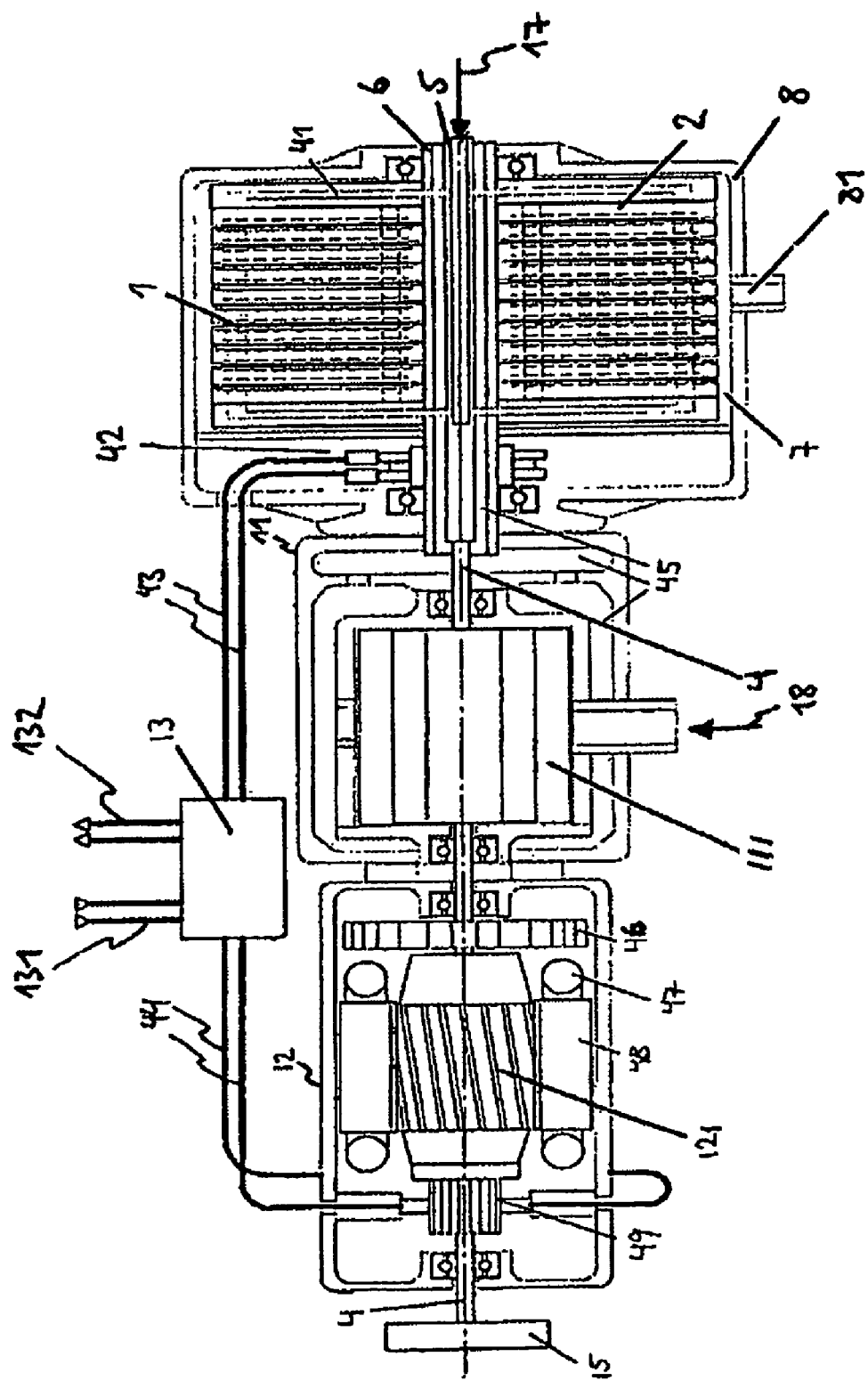
FIG. 4 show a diagrammatic section view of a fuel cell system according to an embodiment of the present invention.

FIG. 4 shows a diagrammatic section view of a fuel cell system according to an embodiment of the present invention. The PEMFC 1 is made from rotationally symmetrical components as a hollow cylinder. In the central borehole 3 (see FIG. 3) of the bipolar plates 2 there is a through shaft 4 which is rigidly connected to the displacement device 111, which is for example a piston or a rotary slide valve, of the compressor 11 and to the armature 121 of the electric motor 12. Of course, according to another embodiment of the present invention the compressor 11 can also be done without.

In the region of the fuel cell 1 the shaft 4 is a hollow shaft 5. By way of this hollow shaft 5, hydrogen 17 flows to the anode of the fuel cell 1. A further hollow shaft 6 encompasses the hollow shaft 5 for the air supply. By way of rotary transmission leadthroughs, the hydrogen 17 is supplied on the free side of the fuel cell 1. If there is no compressor 11, the air too is supplied by way of the rotary transmission leadthroughs on the free side of the fuel cell 1.

When the fuel cell 1 rotates on the shaft 4, the water generated on the cathode side during the electrochemical reaction is extracted by centrifugal force into the collection space 7. To this effect the cathode-side air channels 21 in the bipolar plate 2 are radially aligned (see FIG. 3). The collection space 7 is enclosed by a housing 8 which accommodates the bearing elements of the shafts (4, 5, 6) and further accommodates the rotary transmission leadthroughs. The rotary axle 4 and the hollow shafts 5, 6 of the fuel cell or of the fuel cell system are held in the housing 8 so that in the space enclosing the fuel cell 1 the cathode water can be collected and removed by way of an aperture 81. However, it is also possible for the rotary axle 4 and the hollow shafts 5, 6 of the fuel cell 1 not to be held in a housing 8 so that the cathode water can be removed into the free space enclosing the fuel cell 1.

The drive for rotation of the fuel cell 1 is provided by the electric motor 12, which is non-positively connected to the shaft 4. A mechanical or electromagnetic clutch and a torque converter (gear arrangement) can be arranged between the electric motor 12 and the fuel cell 1.

The end plate 41 of the fuel cell 1 can comprise gas channels.

Within the hollow shafts 5, 6 and the compressor 11 there is an air space 45 which can accommodate corresponding gases.

The clutch 10 and the torque converter 9 (shown in FIG. 1) are constructed in such a way that, with the clutch disengaged too, the air stream can flow from the compressor 11 to the fuel cell 1 by way of the hollow shaft 6. The electrical energy required by the electric motor 12 is supplied by the fuel cell 1.

The electric motor 12 comprises a ventilator 46, an exciting winding 47, a stator 48 and a commutator 49.

By way of the clutch 15, mechanical energy can be transmitted to further (mechanical) consumers such as for example to a pump.

By way of the electrical load controller 13, distribution of the electrical energy required is regulated between the electric motor 12 (by way of lines 44) and the external electrical consumers, and furthermore the switch state of the torque converter 9 of the clutch (see FIG. 1) is regulated. By way of the load controller 13, external electrical energy can also be supplied to the electric motor 12 for other operating states, e.g. for starting up the system. The external electrical energy is fed to the load controller 13 by way of supply lines 131. The internal electrical energy (generated by the fuel cell 1) is fed to the load controller 13 by way of current collectors 42 and lines 43. The electrical energy for further electrical consumers is discharged from the load controller by way of lines 132.

The water arising in the collection space 7 and the humid air from the cathode channels 21 are let out by way of an aperture 81 in the housing 8, for example by way of a condenser with condensate separator, or by way of a humidity-heat exchanger (not shown in FIG. 4) for further utilisation in the process.

Cooling of the PEMFC 1 takes place by way of the bipolar plates or cooling plates of the fuel cell 1, which are enlarged in radial direction to the extent that the projecting rings are cooling lamellae or blades 22 (see FIG. 3).

The fuel cell system according to the invention can for example be used within an aircraft.

Implementation of the invention is not limited to the preferred embodiments shown in the figures. Instead, a multitude of variants are imaginable which use the solution shown and the principle according to the invention even in the case of fundamentally different embodiments.

In addition it should be pointed out that "comprising" does not exclude other elements or steps, and "a" or "one" does not exclude a plural number. Furthermore, it should be pointed out that features or steps which have been described with reference to one of the above embodiments can also be used in combination with other features or steps of other embodiments described above. Reference signs in the claims are not to be interpreted as limitations.

The invention claimed is:

1. A fuel cell system for generating electrical energy, mechanical energy and water, the fuel cell system comprising:
   a shaft;
   a fuel cell connected to the shaft so as to be rotatable;
   a motor including an armature non-positively connected to the shaft,
   a compressor including a displacement device non-positively connected to the shaft;
   a water pump connected to the shaft;
   a first non-positive connection in the shaft between the fuel cell and the motor, the first non-positive connection including a first clutch and a first torque converter, wherein by way of the first non-positive connection energy is transferable from the motor to the fuel cell so that the fuel cell can be made to rotate;
   a second non-positive connection in the shaft between the motor and the water pump, the second non-positive connection including a second clutch and a second torque converter, wherein by way of the second non-positive connection energy from the motor can be transmitted to the water pump so that the water pump is drivable;
   wherein the compressor is designed to provide compressed air to a cathode side of the fuel cell;
   wherein the water pump returns a condensate from cathode exhaust air of the fuel cell for further utilization by the fuel cell, or removes said condensate from the fuel cell system; and
   wherein water generated in an electrochemical reaction in the fuel cell on the cathode side of the fuel cell is extracted by both a centrifugal force from rotation of the fuel cell and a conveying force resulting from an air stream generated by the compressor.

2. The fuel cell system of claim 1, wherein the first clutch is a mechanical or electromechanical clutch.

3. The fuel cell system of claim 1,
wherein furthermore a load controller is provided;
wherein the load controller is designed to distribute required electrical energy between the motor and further electrical consumers, or is designed to control or regulate either or both of the first and second torque converters and either or both of the first and second clutches; and designed to control or regulate the and the clutch; and
wherein the required electrical energy is internally suppliable by the fuel cell or by an external energy source, which is connected to the load controller.

4. The fuel cell system of claim 3, wherein the load controller and the first torque converter are adapted to regulate a rotary speed of the fuel cell and water discharge from cathode-side air channels of the fuel cell, either permanently or intermittently, depending on the electrical or mechanical load.

5. The fuel cell system of claim 3,
wherein the load controller and the first torque converter are adapted to regulate a rotary speed of the compressor, either permanently or intermittently, depending on electrical or mechanical load; and
wherein the load controller and the first torque converter are adapted to regulate a rotary speed of the fuel cell, either permanently or intermittently, independently of electrical or mechanical load.

6. The fuel cell system of claim 1,
wherein the fuel cell is constructed from rotation-symmetrical components.

7. The fuel cell system of claim 1,
wherein in a region of the fuel cell, the shaft is formed as a first hollow shaft; and
wherein the first hollow shaft is designed to feed hydrogen to an anode of the fuel cell.

8. The fuel cell system of claim 7,
wherein a second hollow shaft is provided which encloses the first hollow shaft; and
wherein the second hollow shaft is designed for feeding air to the fuel cell.

9. The fuel cell system of claim 1,
wherein the fuel cell comprises air channels on the cathode side, and gas channels on an anode side;
wherein the air channels are arranged so as to extend radially or in a spiral shape from an inside towards an outside of the fuel cell; and
wherein an arrangement of the gas channels corresponds to an arrangement of the air channels.

10. The fuel cell system of claim 1,
wherein the fuel cell comprises a collection space for water, and a housing which encloses the collection space; and
wherein the housing accommodates bearing elements for the shaft and also accommodates rotary transmission leadthroughs.

11. The fuel cell system of claim 1,
wherein the fuel cell, together with bipolar plates or cooling plates, is held in a housing to as to be rotatable.

12. The fuel cell system of claim 1,
wherein a housing of the fuel cell comprises an inflow channel and an outflow channel for cooling air.

13. The fuel cell system of claim 12,
wherein the housing is formed as an axial blower.

14. The fuel cell system of claim 1,
wherein the fuel cell is a proton exchange membrane fuel cell.

15. An aircraft having a fuel cell system of claim 1.

16. The fuel cell system of claim 6, wherein the fuel cell is constructed from a hollow cylinder.

* * * * *

UNITED STATES PATENT AND TRADEMARK OFFICE
CERTIFICATE OF CORRECTION

| | | |
|---|---|---|
| PATENT NO. | : 7,807,315 B2 | Page 1 of 1 |
| APPLICATION NO. | : 11/225589 | |
| DATED | : October 5, 2010 | |
| INVENTOR(S) | : Claus Hoffjann, Hansgeorg Schuldzig and Hans-Jürgen Heinrich | |

It is certified that error appears in the above-identified patent and that said Letters Patent is hereby corrected as shown below:

Title Page

**\*\* On the Face of the Patent (54) Title**, delete the word "ROTABLE" and insert the word --ROTATABLE--

Column 1, line 1, delete the word "ROTABLE" and insert the word --ROTATABLE--

Column 7, lines 10 and 11, delete the words "and designed to control or regulate the and the clutch;"

Column 8, line 23, delete the word "to" and insert the word --so-- (first occurrence) \*\*

Signed and Sealed this
Fourth Day of October, 2011

David J. Kappos
*Director of the United States Patent and Trademark Office*